Patented May 11, 1954

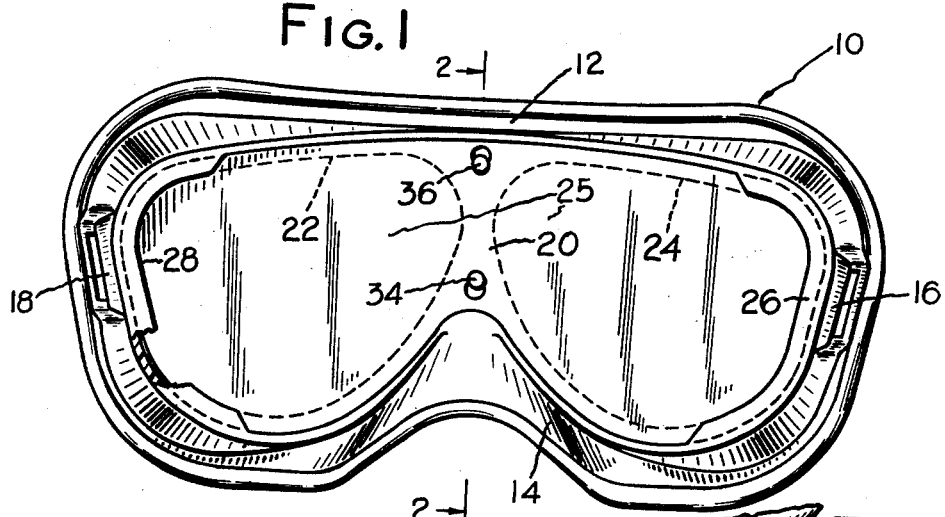
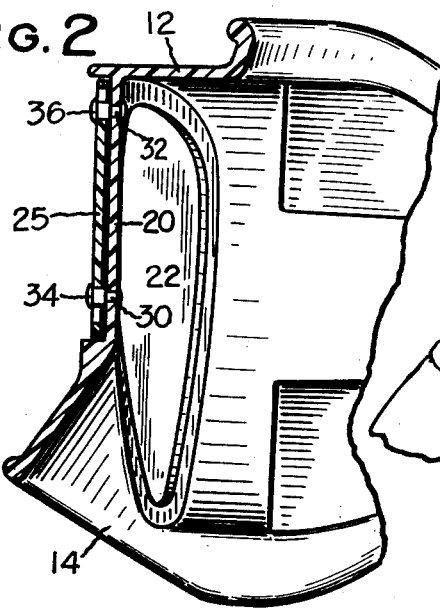
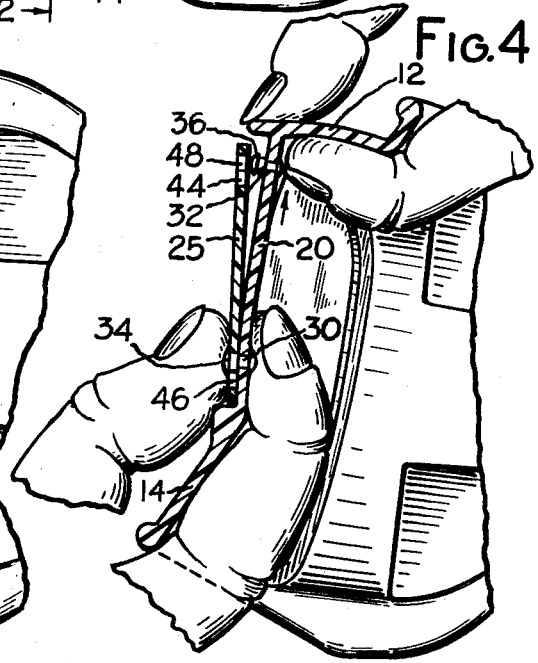

2,677,824

UNITED STATES PATENT OFFICE 2,677,824

LENS FASTENING MEANS FOR GOGGLES

Fred G. Gay, Jr., and Stanley J. Ragaisis, Rochester, N. Y., assignors to Bausch & Lomb Optical Company, Rochester, N. Y., a corporation of New York Application November 8, 1952, Serial No. 319,482

2 Claims. (Cl. 2—14)

This invention relates to an improved goggle of the "cover-all" type and more particularly it relates to novel means for fastening or securing a one-piece lens to the goggle.

A primary object of the invention is to provide a goggle having improved means for locking a one-piece lens on the frame thereof.

Another object of the invention is to provide a goggle having a lens that may be easily removed from or attached to the frame of the goggle.

Further objects and advantages reside in the novel details of construction, and the arrangement and combination of parts which are described in the specification herebelow and are shown in the accompanying drawing in which:

Fig. 1 is a front elevation, partly broken away, showing a goggle embodying one form of the invention;

Fig. 2 is a sectional view taken on the line 2—2 in Fig. 1;

Fig. 3 is a partial front elevation of a one-piece protective lens showing part of the new attaching means;

Fig. 4 is another sectional view along the line 2—2 in Fig. 1 showing how the lens is attached to the goggle frame.

The goggle used for illustration in the present invention comprises a frame 10 having an upper portion 12, a lower portion 14 and end portions 16 and 18. Fastened between the upper and lower portions of the frame is an elastic, expandable spacer member 20 which separates the sight apertures or openings 22 and 24. Around the two end portions of the frame are provided means for positioning a one-piece eye protective lens 25 on the frame. In this style of goggle frame, the means comprise overhanging lips 26 and 28 which extend over the outer faces of the peripheral end portions of lens 25 to position same on the frame. The frame 10 may be made of any suitable material such as plastic so that the elastic spacer member 20 may be formed integrally with the frame.

Projecting outwardly from the spacer member 20 is a pair of spaced rivets or engaging means 30 and 32 having heads 34 and 36, respectively, on the outer ends of the rivets. The rivets are normally spaced apart a set distance and are secured to the elastic spacer in any suitable fashion. The rivets 30 and 32 can be separated a limited amount by stretching the elastic spacer member 20. Upon releasing the pressure being used to separate the rivets, the spacer will contract to its original shape. It is to be understood that the rivets could be mounted on the lens 25 and the slots disposed on the spacer member without departing from the spirit of this invention.

The one-piece plastic eye protective lens member 25 is provided at its center with a pair of keyholes or coacting means 38 and 40. The smaller half 42 of keyhole 38 and smaller half 44 of keyhole 40 point inwardly toward each other and are spaced apart a distance equal to the normal distance between the rivets 30 and 32. The smaller halves 42 and 44 are large enough to receive the stems of rivets 30 and 32, but will not permit the heads 34 and 36 of the rivets to pass therethrough. The larger half 46 of keyhole 38 and larger half 48 of keyhole 40 are of a size to permit the heads 34 and 36, respectively, of rivets 30 and 32 to pass therethrough.

Referring to Fig. 4, a single piece eye protective lens 25 may be attached to the frame by inserting the outer ends of the lens under the overhanging lips 26 and 28. The heads 34 of rivet 30 is inserted in larger half 46 of keyhole 38 and the lens is moved so as to engage rivet 30 in smaller half 42 of the keyhole. The lens 25 and rivet 30 are gripped by the fingers while the spacer 20 is stretched or expanded by pressure applied in the direction of the arrow to the upper portion 12 of the frame by the other fingers. In this expanded position, the head 36 of rivet 32 is inserted through larger half 48 of keyhole 40. Upon release of the expanding pressure, the spacer will contract and will move the rivet 32 into the smaller half 44 of keyhole 40. In this position, the lens 25 will be locked securely in place on the goggle frame 10. The keyholes could be bayonet slots or any other appropriately shaped slots possessing one large and one small portion, or an entering portion and a small engaging portion. The lens 25 may be readily removed by expanding or stretching the spacer member 20 so that the rivet heads 34 and 36 may be disengaged from the keyholes.

Although only a preferred embodiment of this invention has been shown and described in detail, it will be understood that other embodiments are possible and changes may be made in the form and arrangement of the parts thereof and substitutions may be made therein without departing from the spirit of the invention as defined in the claims herebelow appended.

We claim:

1. In a goggle having a frame and an elastic spacer disposed between a pair of sight openings on said frame, the combination of an integral eye protective lens removably attached to said frame over said sight openings, fastening means for removably locking said lens on said frame comprising two vertically spaced headed rivets projecting outwardly from the spacer for coaction with two vertically spaced keyholes formed in the lens, each keyhole having large and small portions, the small portions of said keyholes being directed toward each other and spaced apart the normal distance between the rivets, the heads of the rivets being smaller than the large portions and larger than the small portions of the keyholes so that the spacer may be stretched to move the rivet heads into alignment with the large portions of the keyholes whereby the lens is detachably mounted on the frame.

2. A goggle comprising a frame having two sight openings, an elastic spacer member integrally formed with said frame between said sight openings, a pair of vertically spaced, headed rivets outwardly projecting from said spacer, and an integral lens member mounted over the sight openings and having a pair of vertically spaced keyholes respectively adjacent to said rivets, each keyhole having a large portion for permitting the head of a rivet to pass therethrough and a small portion for holding the head of the rivet engaged with the lens, the small portions of the keyholes being directed toward each other and spaced apart a distance substantially equal to the normal distance between the rivets whereby the spacer may be stretched to move the rivet heads into alignment with the large portions of the keyholes whereupon contraction of the spacer will move the rivets into the small portions of the keyholes for detachably mounting the lens on the frame.

References Cited in the file of this patent

UNITED STATES PATENTS

| Number | Name | Date |
| --- | --- | --- |
| 2,388,205 | Bernheim et al. | Oct. 30, 1945 |
| 2,409,140 | Malcom | Oct. 8, 1946 |
| 2,446,048 | Kimball | July 27, 1948 |